United States Patent
Yokoyama et al.

(10) Patent No.: US 6,702,879 B2
(45) Date of Patent: Mar. 9, 2004

(54) AIR FILTERING MATERIAL FOR AIR CLEANING

(75) Inventors: Kazutaka Yokoyama, Wako (JP); Daisuke Susa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 26 days.

(21) Appl. No.: 10/176,370

(22) Filed: Jun. 21, 2002

(65) Prior Publication Data

US 2003/0010003 A1 Jan. 16, 2003

Related U.S. Application Data

(63) Continuation-in-part of application No. 09/774,005, filed on Jan. 31, 2001, now abandoned.

(30) Foreign Application Priority Data

Feb. 3, 2000 (JP) .......................................... 2000-26398

(51) Int. Cl.$^7$ ................................................ B01D 47/00
(52) U.S. Cl. ..................... 96/296; 55/DIG. 5; 261/104; 264/257; 264/271.1; 264/DIG. 48
(58) Field of Search ........................ 96/296, 290, 294; 55/DIG. 5; 95/210, 211, 212; 261/104; 264/257, 271.1, DIG. 48

(56) References Cited

U.S. PATENT DOCUMENTS

| | | |
|---|---|---|
| 5,704,966 A | 1/1998 | Rohrbach et al. |
| 5,713,971 A | 2/1998 | Rohrbach et al. |
| 5,744,236 A | 4/1998 | Rohrbach et al. |
| 5,759,394 A | 6/1998 | Rohrbach et al. |
| 5,902,384 A | 5/1999 | Rohrbach et al. |
| 5,951,744 A | 9/1999 | Rohrbach et al. |

FOREIGN PATENT DOCUMENTS

JP 11-156123 6/1999

*Primary Examiner*—Blaine Copenheaver
*Assistant Examiner*—Minh-Chau T. Pham
(74) *Attorney, Agent, or Firm*—Armstrong, Kratz, Quintos, Hanson & Brooks, LLP

(57) ABSTRACT

An air filtering material for air cleaning is formed of a nonwoven fabric of hollow chemical fibers having longitudinal interior holes containing an oil. The hollow chemical fibers have randomly formed minute cracks and/or fissures formed through the walls of the fibers. The cracks and/or fissures have a width of the order of 1 ìm. The oil gradually exudes from within the longitudinal holes through the cracks and/or fissures to wet the outer surfaces of the hollow chemical fibers to enhance the filtering ability of the air filtering material by binding dust particles by the sticky oil.

8 Claims, 5 Drawing Sheets

Fig.5

Table 1

| Samples | Material of fiber | Type of fibers | Fineness (d) | Thickness (mm) | Porosity (ε) | Weight per unit area (g/m²) | Oil content (%) |
|---|---|---|---|---|---|---|---|
| F1 | Polyester | Hollow | 3.9 | 2.4 | 0.92 | 208 | 10 |
| F2 | Polyester | Hollow | 3.9 | 2.5 | 0.93 | 222 | 6 |
| F3 | Polyester | Hollow | 3.9 | 2.4 | 0.92 | 213 | 6 |
| F4 | Polyester | Hollow | 3.9 | 2.4 | 0.94 | 205 | 6 |

Table 2

| Samples | Material of fiber | Type of fibers | Fineness (d) | Thickness (mm) | Porosity (ε) | Weight per unit area (g/m²) | Oil content (%) |
|---|---|---|---|---|---|---|---|
| f 1 | Polyester | Solid | 8 | 2.9 | 0.92 | 300 | 0 |
| f 2 | Polyester | Solid | 5 | 2.8 | 0.90 | 214 | 0 |
| f 3 | Polyester | Solid | 5 | 2.9 | 0.89 | 212 | 0 |
| f 4 | Polyester | Solid | 5 | 3.5 | 0.90 | 340 | 0 |
| f 5 | Polyester | Solid | 5 | 3.5 | 0.85 | 340 | 0 |

AIR FILTERING MATERIAL FOR AIR CLEANING

CROSS REFERENCE

This application is a continuation-in-part-application of U.S. patent application Ser. No. 09/774,005 filed Jan. 31, 2001 now abandoned.

BACKGROUND OF THE INVENTION

1. Field of the Invention

The present invention relates to an air filtering material for air cleaning capable of removing dust from air.

2. Description of the Related Art

JP-A No. Hei 11-156123 discloses an air cleaning device capable of collecting dust at a high collection efficiency. The air cleaning device has a coarse filter unit provided with a coarse air filtering material and a fine air filtering unit provided with a fine air filtering material in combination and is intended to filter dust at a high collection efficiency and to use the filtering materials for an extended period of time.

Filter paper as air filtering material catches dust particles in spaces between fibers. A nonwoven fabric of chemical fibers as air filtering material catches small dust particles by the agency of static electricity accumulated on the surfaces of the chemical fibers and catches large dust particles in spaces between the chemical fibers. Therefore, the spaces between the fibers must be miniaturized to improve cleaning efficiency, i.e., collection efficiency. However, the miniaturization of spaces between the fibers entails increase in the airflow resistance of the air filtering material and, when an air cleaner provided with such an air filtering material is placed in the intake system of an internal combustion engine, the air cleaner reduces the combustion efficiency of the internal combustion engine.

An air filtering material formed by oiling filter paper is capable of cleaning air at a high cleaning efficiency by the combined effect of catching dust particles in spaces between fibers and binding dust particles by the sticky oil. However, the airflow resistance of the filter paper cannot be reduced by expanding the spaces between the fibers of the filter paper because the oil is held in the minute spaces between the fibers of the filter paper by surface tension. It is difficult to hold an oil on a nonwoven fabric of chemical fibers because chemical fibers, in general, have smooth surfaces and the oil is unable to adhere easily to the surfaces of the chemical fibers.

SUMMARY OF THE INVENTION

The present invention has been made in view of those problems and it is therefore an object of the present invention to provide an air filtering material for air cleaning, capable of cleaning air at a high cleaning efficiency and at a low airflow resistance.

According to the present invention, an air filtering material for arresting dust from air that is caused to flow through the material, to thereby clean the air, comprises: a nonwoven fabric made of hollow chemical fibers each having therein a hole extending longitudinally thereof; each of the hollow chemical fibers having cracks and/or fissures defining minute clearances formed in an outer wall thereof so as to reach the longitudinal hole to thereby communicate the longitudinal hole with an exterior of the fiber; and an oil impregnated within the longitudinal hole, the cracks and fissures having a width on the order of a micrometer or micrometers so that the oil within the longitudinal hole is caused to gradually exude through the cracks and fissures to the exterior of the fiber, whereby the dust is arrested by the exuding oil.

Therefore, large and small dust particles can be collected at a high collection efficiency by the combined effect of catching dust particles in spaces between the chemical fibers and binding dust particles by the oil even if the chemical fibers are distributed coarsely to reduce the air flow resistance of the air filtering material. The oil gradually exudes through the capillary cracks and/or fissures to wet the outer surfaces of the chemical fibers, so that dust particles can be bound by the oil wetting the surfaces of the chemical fibers, which further improves the cleaning efficiency of the air filtering material. Since the oil is caused to exude through the capillary cracks and/or fissures, the exudation of the oil is gradually effected and the oil continues to be adhered to the outer surfaces of the hollow fibers for a prolonged time, so that the air filtering operation can be maintained for a long time.

BRIEF DESCRIPTION OF THE DRAWINGS

The above and other objects, features and advantages of the present invention will become more apparent form the following description taken in connection with the accompanying drawings, in which:

FIG. 5 show tables showing the characteristics of air filtering materials according to the present invention and conventional air filtering materials;

DESCRIPTION OF THE PREFERRED EMBODIMENTS

Filtering materials for air cleaning according to the present invention will be described as applied to a cleaning element of an air cleaner to be placed in the intake system of an internal combustion engine.

Figure 1:
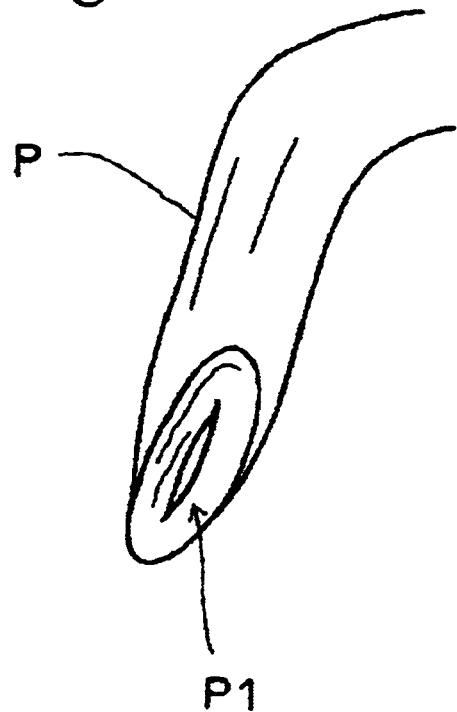
FIG. 1 is an enlarged, fragmentary perspective view of a hollow chemical fiber for forming an air filtering material according to the present invention.
Figure 2:
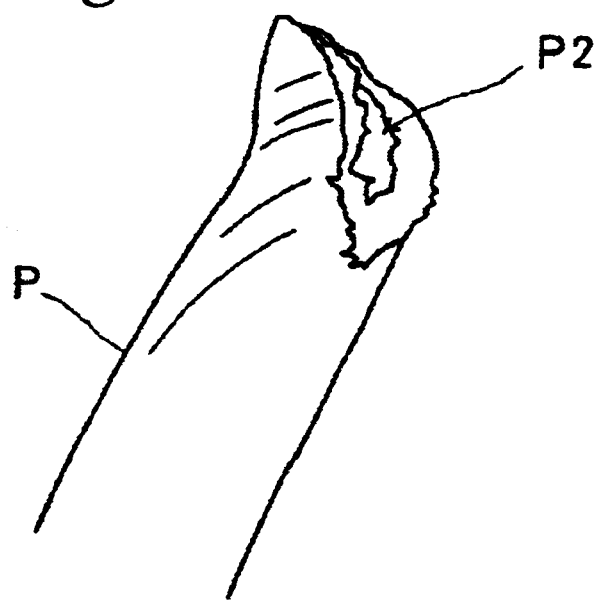
FIG. 2 is an enlarged, fragmentary perspective view of another hollow chemical fiber for forming an air filtering material embodying the present invention.

An air filtering material is made of a nonwoven fabric of hollow chemical fibers P, for example, sinthetic resin fibers such as polyester fibers, having longitudinal hollow interiors or holes therein. The longitudinal holes of the fibers P are impregnated or filled with an oil, such as a mineral oil (paraffin-based or naphthen-based oil). A hollow fiber P shown in FIG. 1 has a cleanly cut end P1 like that formed by cutting the hollow fiber P with a sharp knife. A hollow fiber P shown in FIG. 2 has a rugged end P2 like that formed by tearing off the hollow fiber P. The oil contained in the longitudinal hollow interiors or holes of the hollow fibers P exudes through the open ends of the longitudinal holes opening at the ends P1 and P2.

Figure 3:
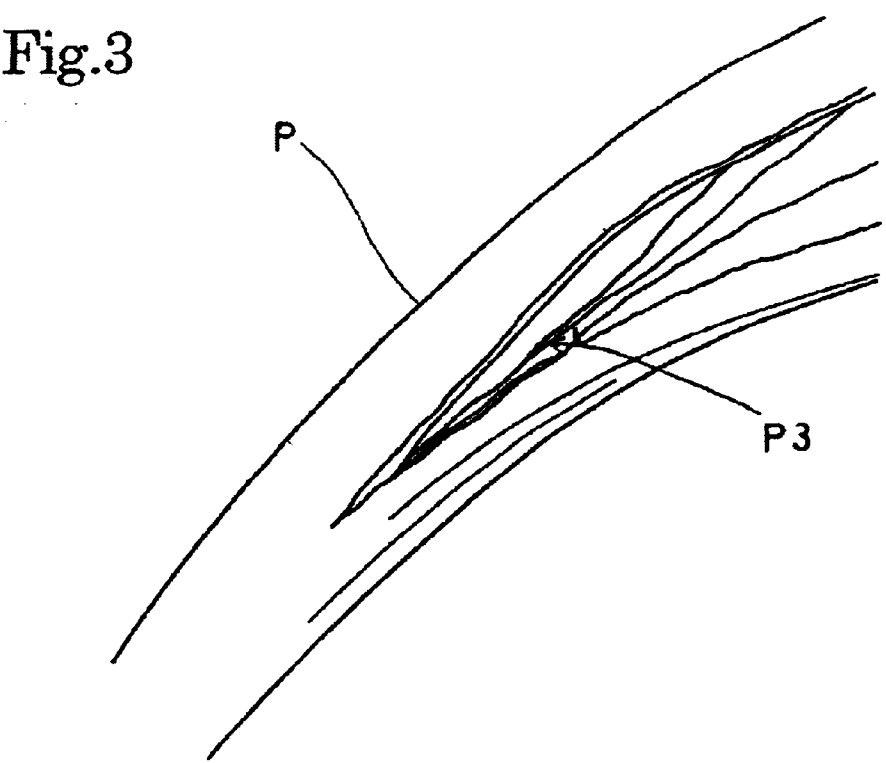
FIG. 3 is an enlarged, fragmentary perspective view of a hollow chemical fiber having fissures.
Figure 4:
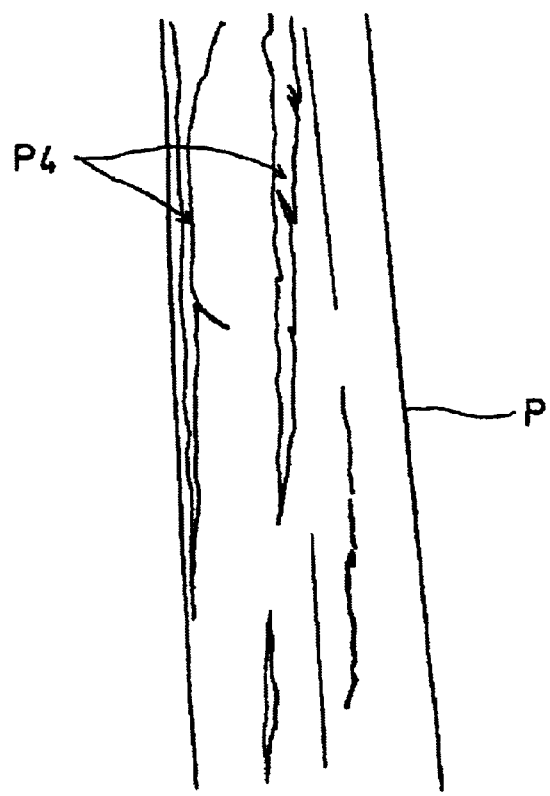
FIG. 4 is an enlarged, fragmentary perspective view of a hollow chemical fiber having cracks.

The hollow fiber P does not have a regularly tubular shape; the hollow fiber P has minute fissures P3 reaching its interior hole as shown in FIG. 3 or minute cracks P4 reaching its interior hole as shown in FIG. 4. The oil contained in the interior hole is able to gradually exude through the fissures P3 or the cracks P4 since the fissures and/or the cracks are minute or of capillary dimensions. Many fissures P3 or cracks P4 are formed deliberately or artificially in the hollow fiber P so that the oil is able to gradually spread over the outer surface of the hollow fiber P.

The outer diameter of each hollow fiber P is on the order of 20 micrometers (ìm). The width of the fissures P3 or the cracks P4 is on the order of a micrometer or micronmeters, for example, approximately 1 micrometer (ìm). When the dimensions of the hollow fibers and the fissures or cracks are determined as above, the ratio of the total area of the openings provided by the fissures and/or cracks, to the total area of the outer surfaces of the hollow fibers, that is, the opening degree, is from approximately 1/20 to approximately 1/60.

Four examples F1, F2, F3 and F4 of air filtering materials according to the present invention were prepared by cutting nonwoven fabrics of polyester hollow fibers impregnated with an oil and having different properties as shown in Table 1 shown in FIG. 5. Five comparative examples f1, f2, f3, f4 and f5 of conventional air filtering materials were prepared by cutting nonwoven fabrics of ordinary round polyester fibers having a round section and not impregnated with oil and having different properties as shown in Table 2 shown in FIG. 5. The examples F1 to F4 and the comparative examples f1 to f5 were tested to measure cleaning efficiency and airflow resistance. In Tables 1 and 2, the fineness of the fibers is expressed in denier (d=50 mg/450 m).

The respective airflow resistances of the examples F1, F2 and F3 were substantially equal to those of the comparative examples f1, f2 and f3. The respective cleaning efficiencies of the examples F4 and F3 were substantially equal to those of the comparative examples f4 and f5.

Figure 6:
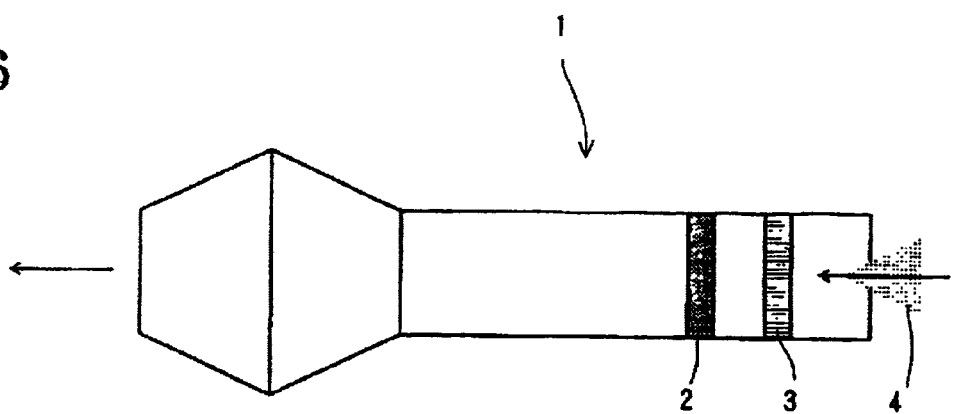
FIG. 6 is a schematic side elevation of a testing machine for collection efficiency measurement.

An air filtering material testing device 1 shown in FIG. 6 was used for testing the air filtering materials with respect to cleaning efficiency. As shown in FIG. 6, the air filtering material testing device 1 had a duct which has a tubular portion of 70 mm in inside diameter, an expanding portion extending from the lower end of the tubular portion and expanding toward its lower end, and a tapering portion extending from the lower end of the expanding portion and tapering toward its lower end. An absolute filter 2 capable of completely removing dust from air was placed at a middle position in the tubular portion. A test sample 3 of the air filtering material was placed at a position above the absolute filter 2 in the tubular portion of the duct. Standard dust 4, such as the test dust of Class 8(fine) specified in JIS Z 8901, for testing the performance of automotive air cleaners was used for the tests. About 2 grams of the standard dust 4 was added to air flowing at 1 m³/min through the duct of the air filtering material testing device 1. The weight of the sample 3 before the test and that of the same after the test were measured, and the difference between the weight before the test and the weight after the test was calculated to determine a collected dust weight A, i.e., the weight of the dust collected by the sample 3. The weight of the absolute filter 2 before the test and that of the same after the test were measured, and the difference between the weight before the test and the weight after the test was calculated to determine an absolute collected dust weight B, i.e., the weight of the dust collected by the absolute filter 2. Cleaning efficiency was calculated by using the following expression.

Cleaning efficiency=$\{A/(A+B)\} \times 100$ (%)

Figure 7:
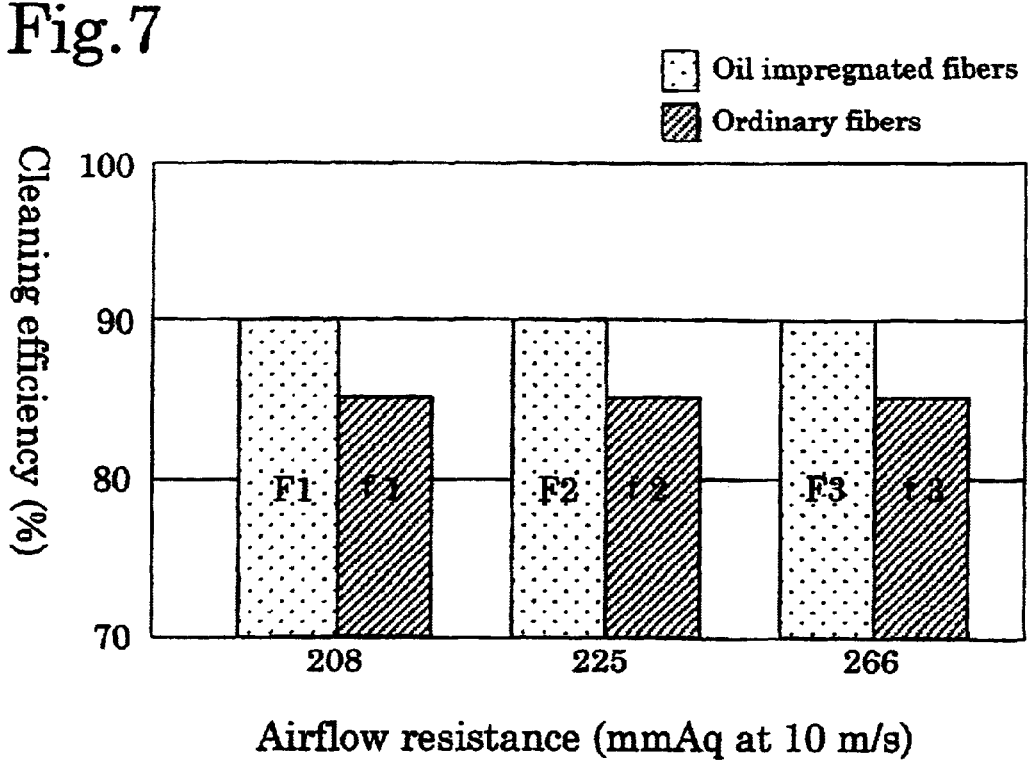
FIG. 7 is a graph comparatively showing cleaning efficiencies of air filtering materials according to the present invention and those of conventional air filtering materials for airflow resistances.

As shown in FIG. 7, the cleaning efficiency of the examples F1, F2 and F3 of the air filtering materials according to the present invention respectively having airflow resistances of 208, 225, 266 mmAq at 10 m/s was 90%, while the cleaning efficiency of the comparative examples f1, f2 and f3 of the conventional air filtering materials was lower than that of the examples F1, F2 and F3. The cleaning efficiency of the examples F1, F2 and F3 was higher than that of the comparative examples f1, f2 and f3 by about 5%, because the present invention improves cleaning efficiency by catching dust particles by the oil exuded from within the longitudinal interior holes of the fibers and wetting the surfaces of the fibers in addition to catching dust particles in spaces between the fibers instead of improving the cleaning efficiency by increasing the density of the fibers.

Figure 8:
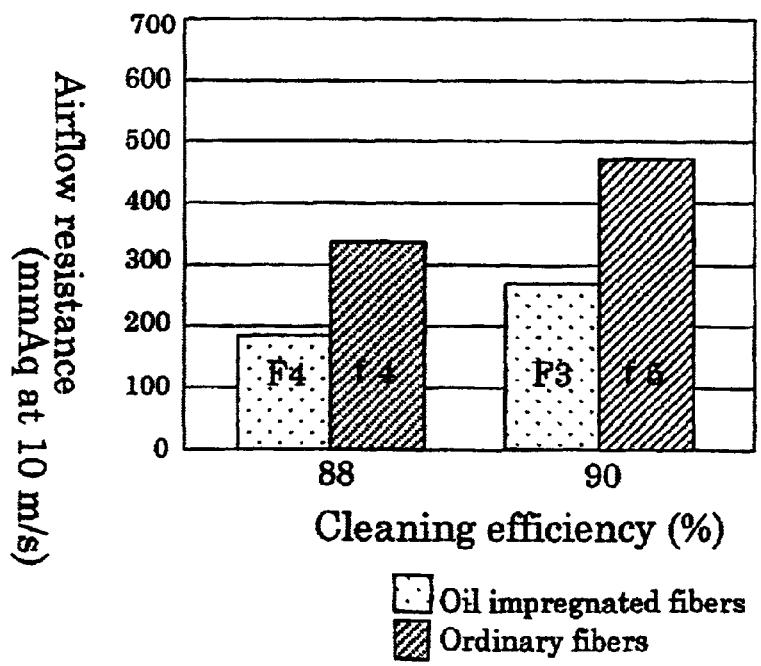
FIG. 8 is a graph comparatively showing airflow resistances of air filtering materials according to the present invention and those of conventional air filtering materials for cleaning efficiencies.

It is obvious from FIG. 8 comparatively showing the airflow resistances of the comparative examples f4 and f5 respectively having cleaning efficiencies of 88% and 90% and the examples F4 and F3 respectively having the same cleaning efficiencies as the comparative examples F4 and f5 that the airflow resistance of the air filtering materials of the present invention are far lower than that of the conventional air filtering materials.

As apparent from the foregoing description, the air filtering material of the present invention includes hollow chemical fibers having longitudinal interior holes containing an oil and is capable of catching dust particles by the oil exuding from the longitudinal holes and wetting the outer surfaces of the hollow chemical fibers in addition to catching dust particles in spaces between the hollow chemical fibers. Consequently, the air filtering material exerts a low airflow resistance on air flowing through it and is able to achieve a high cleaning efficiency. When the air filtering material is used for forming the cleaner element of an air cleaner to be placed in the intake system of an internal combustion engine, intake air can be cleaned at a high cleaning efficiency, and the internal engine is able to operate at a high combustion efficiency because the airflow resistance of the cleaner element is low.

The conventional air filtering material that catches dust particles only in spaces between the fibers is clogged with a small amount of dust and its airflow resistance increases greatly. Since the oil wetting the outer surfaces of the hollow chemical fibers of the air filtering material of the present invention catches dust particles, the air filtering material is not clogged easily even if a large amount of dust is caught by the air filtering material and has a large filtering capacity; that is, the air filtering material of the present invention has an extended service life.

The hollow chemical fibers may have, in addition to fissures and cracks, many fine thorns on their surfaces. The oil can be held between such fine thorns, which enhances the dust catching ability of the hollow chemical fibers to improve cleaning efficiency.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An air filtering material for arresting dust from air that is caused to flow through the material, to thereby clean the air, comprising:

a nonwoven fabric made of hollow chemical fibers each having therein a hole extending longitudinally thereof;

each of said hollow chemical fibers having cracks and/or fissures defining minute clearances formed in an outer wall thereof so as to reach the longitudinal hole to thereby communicate the longitudinal hole with an exterior of the fiber; and an oil impregnated within said longitudinal hole, said cracks and fissures having a width on the order of a micrometer or micrometers so that the oil within the longitudinal hole is caused to gradually exude through the cracks and fissures to the exterior of the fiber, whereby the dust is arrested by the exuding oil.

2. The air filtering material according to claim 1, wherein the width of said cracks and fissures is approximately 1 micrometer.

3. The air filtering material according to claim 1, wherein said hollow fibers have irregular tubular shape.

4. The air filtering material according to claim 1, wherein said hollow fibers have cleanly longitudinal ends.

5. The air filtering material according to claim 1, wherein said hollow chemical fibers have rugged longitudinal tubular shape.

6. The air filtering material according to claim 1, wherein said fibers having a diameter of approximately 20 micrometers.

7. The air filtering material according to claim 1, wherein a ratio of total area of openings provided by the fissures and/or cracks, to total area of outer surfaces of the hollow fibers, that is, an opening degree, is from $1/20$ to $1/60$.

8. The air filtering material according to claim 1, wherein said oil is a mineral oil.

* * * * *